United States Patent
Nakayama

(10) Patent No.: US 11,571,808 B2
(45) Date of Patent: Feb. 7, 2023

(54) ROTARY AXIS MODULE AND ROBOT

(71) Applicant: FANUC CORPORATION, Yamanashi (JP)

(72) Inventor: Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 197 days.

(21) Appl. No.: 17/038,444

(22) Filed: Sep. 30, 2020

(65) Prior Publication Data

US 2021/0122034 A1    Apr. 29, 2021

(30) Foreign Application Priority Data

Oct. 28, 2019    (JP) .............................. JP2019-195093

(51) Int. Cl.
| | | |
|---|---|---|
| *B25J 9/10* | (2006.01) | |
| *B25J 9/12* | (2006.01) | |
| *B25J 9/08* | (2006.01) | |
| *B25J 19/00* | (2006.01) | |
| *B25J 9/16* | (2006.01) | |
| *B25J 13/08* | (2006.01) | |

(52) U.S. Cl.
CPC ............... *B25J 9/126* (2013.01); *B25J 9/08* (2013.01); *B25J 9/1694* (2013.01); *B25J 13/085* (2013.01); *B25J 19/0004* (2013.01); *B25J 19/005* (2013.01); *B25J 19/0025* (2013.01)

(58) Field of Classification Search
CPC ...... B25J 9/1694; B25J 13/085; B25J 19/005; B25J 19/0025; B25J 19/0004
See application file for complete search history.

(56) References Cited

U.S. PATENT DOCUMENTS

| | | |
|---|---|---|
| 2005/0165271 A1 | 7/2005 | Shioda et al. |
| 2006/0192515 A1* | 8/2006 | Takayama ............ B25J 19/0004 318/568.21 |
| 2008/0116828 A1 | 5/2008 | Horikoshi et al. |
| 2011/0040406 A1 | 2/2011 | Shioda et al. |
| 2017/0259436 A1 | 9/2017 | Nakayama et al. |

FOREIGN PATENT DOCUMENTS

| | | |
|---|---|---|
| EP | 1 557 134 A1 | 7/2005 |
| EP | 1 926 203 A2 | 5/2008 |
| JP | H05-116093 A | 5/1993 |
| JP | 2004-306159 A | 11/2004 |
| JP | 2005-204999 A | 8/2005 |
| JP | 2008-131759 A | 6/2008 |
| JP | 4320556 B2 | 8/2009 |
| JP | 2017-159397 A | 9/2017 |
| JP | 6506195 B | 4/2019 |

* cited by examiner

*Primary Examiner* — Randell J Krug

(74) *Attorney, Agent, or Firm* — Maier & Maier, PLLC

(57) ABSTRACT

A rotary axis module includes an actuator that includes a first member and a second member, the actuator relatively driving the second member so as to rotate about a predetermined axis with respect to the first member, a DC power source, and a switch. The actuator includes a brake that is releasable by supplying a DC voltage. A first brake circuit that is connected to a control device that controls the actuator, and a second brake circuit that is provided in parallel with the first brake circuit and connected to the DC power source via the switch, are connected to the brake.

12 Claims, 7 Drawing Sheets

__RotaryAxisModule_and_Robot__

ROTARY AXIS MODULE AND ROBOT

CROSS-REFERENCE TO RELATED APPLICATIONS

This application is based on Japanese Patent Application No. 2019-195093, the content of which is incorporated herein by reference.

FIELD

The present disclosure relates to a rotary axis module and a robot.

BACKGROUND

There is a known rotary module including an actuator having a fixed member to which a first link is to be attached and a mobile member to which a second link, which is rotatable relative to the fixed member, is to be attached (refer to, for example, Publication of Japanese Patent No. 6506195).

SUMMARY

One aspect of the present disclosure is directed to a rotary axis module including an actuator that includes a first member and a second member, the actuator relatively driving the second member so as to rotate about a predetermined axis with respect to the first member, a DC power source, and a switch, in which the actuator includes a brake that is releasable by supplying a DC voltage, and a first brake circuit that is connected to a control device that controls the actuator, and a second brake circuit that is provided in parallel with the first brake circuit and connected to the DC power source via the switch, are connected to the brake.

DETAILED DESCRIPTION OF EMBODIMENTS

A rotary axis module 1 and a robot according to an embodiment of the present disclosure will be described below with reference to the drawings.

Figure 1:
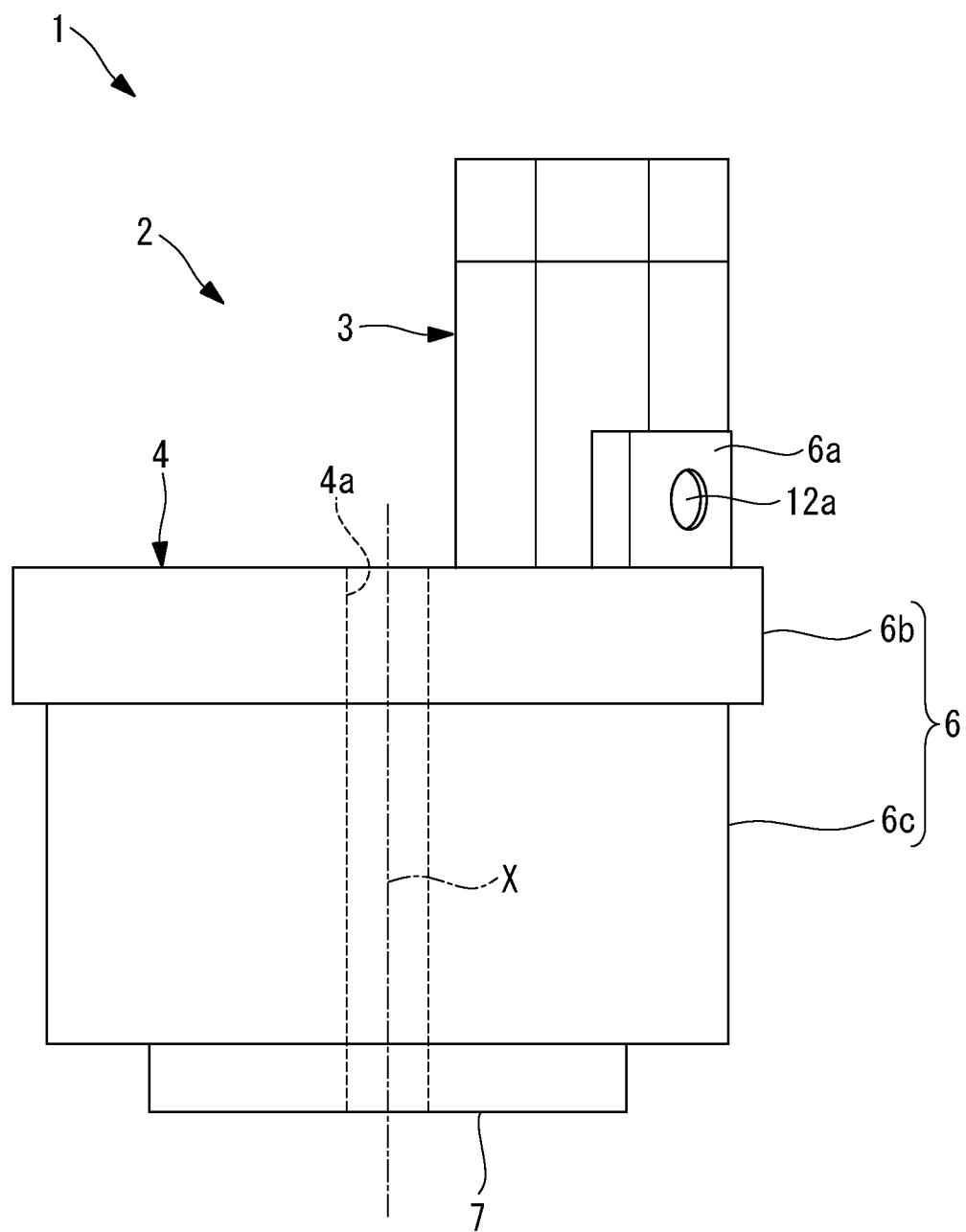
FIG. 1 is a side view illustrating a rotary axis module according to an embodiment of the present disclosure.
Figure 2:
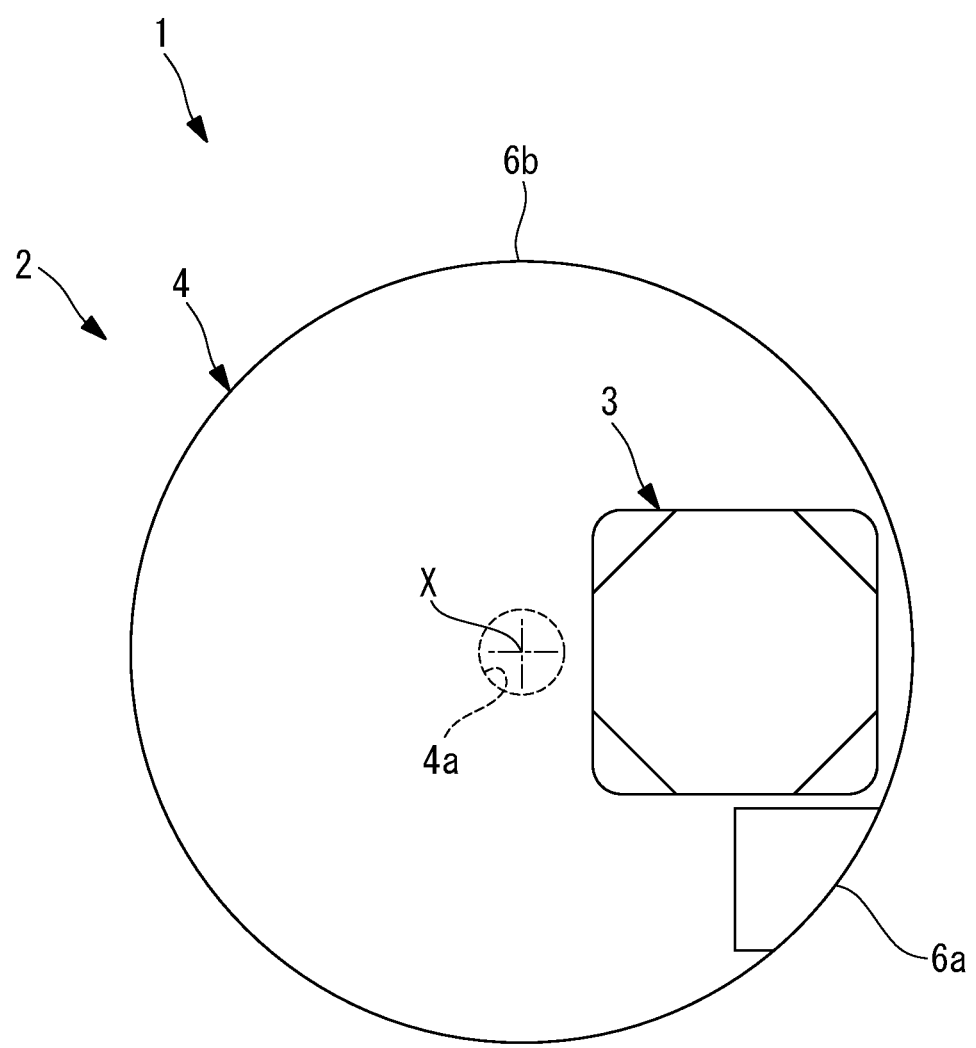
FIG. 2 is a plan view illustrating the rotary axis module in FIG. 1.

The rotary axis module 1 according to this embodiment includes an actuator 2 as illustrated in FIGS. 1 and 2. The actuator 2 includes a motor 3 and a speed reducer 4 that reduces the rotation speed of the motor 3.

The motor 3 is provided with a brake 5, which is maintained in a braking state when a DC voltage is not supplied and is releasable from the braking state by supplying a DC voltage, and an encoder (not illustrated).

The speed reducer 4 is provided with a fixed member (first member) 6 to which the motor 3 is fixed, and a mobile member (second member) 7 that is supported so as to rotate relative to the fixed member 6 about a predetermined axis X, and a hollow hole 4a penetrating the fixed member 6 and the mobile member 7 in a direction along the predetermined axis X. The speed reducer 4 drives the mobile member 7 so as to rotate with respect to the fixed member 6 at a rotation speed obtained by reducing the rotation speed of the motor 3 in accordance with a reduction ratio. The fixed member 6 is integrally formed of a large-diameter portion 6b and a small-diameter portion 6c.

Figure 3:
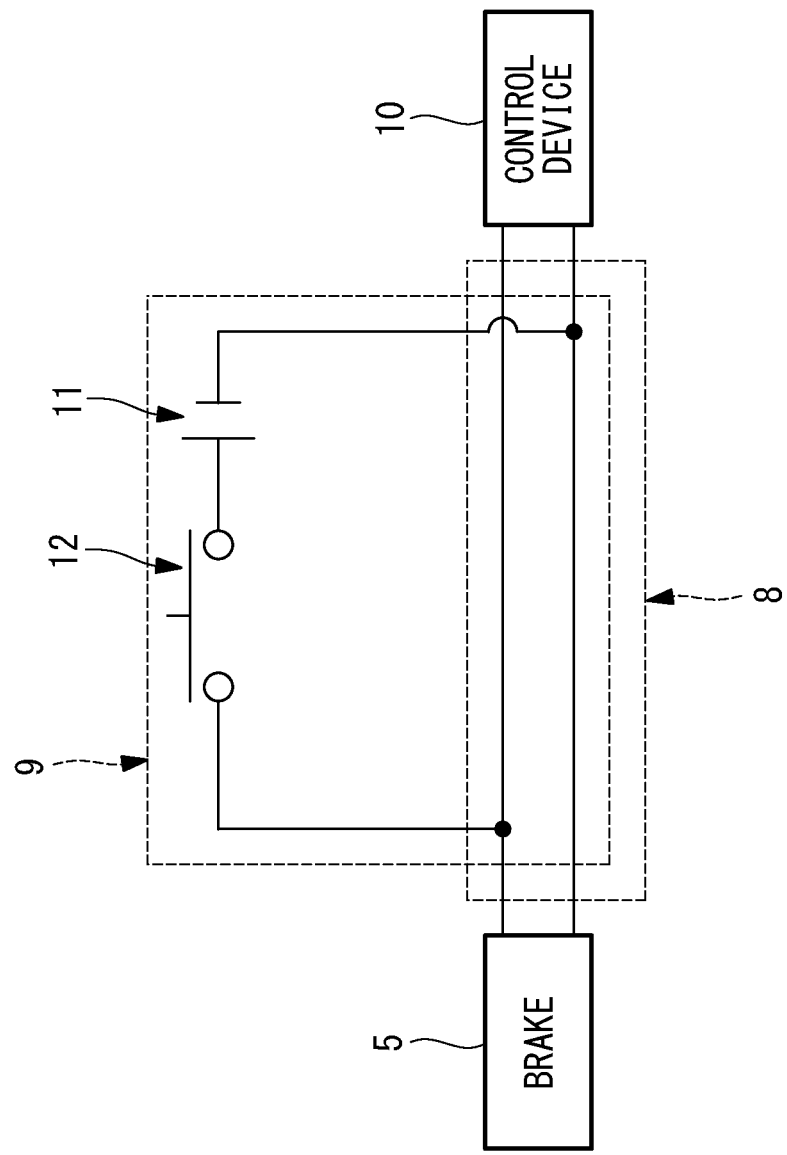
FIG. 3 is a schematic diagram illustrating brake circuits provided in the rotary axis module in FIG. 1.

As illustrated in FIG. 3, the rotary axis module 1 further includes a first brake circuit 8 and a second brake circuit 9 that are connected in parallel to two terminals of the brake 5 of the motor 3. The first brake circuit 8 is connected to a control device 10 that controls the motor 3. The second brake circuit 9 connects between the two terminals of the brake 5 via a DC power source 11 and a switch 12, which are disposed in series.

Figure 4:
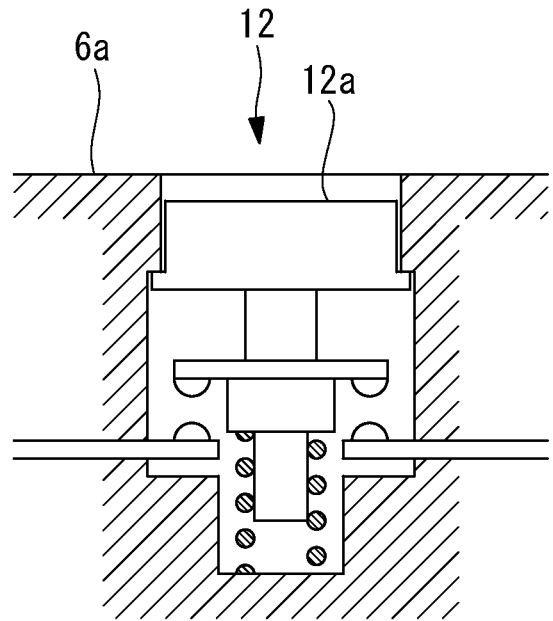
FIG. 4 is a vertical sectional view illustrating a free state of a switch included in a brake circuit in FIG. 3.
Figure 5:
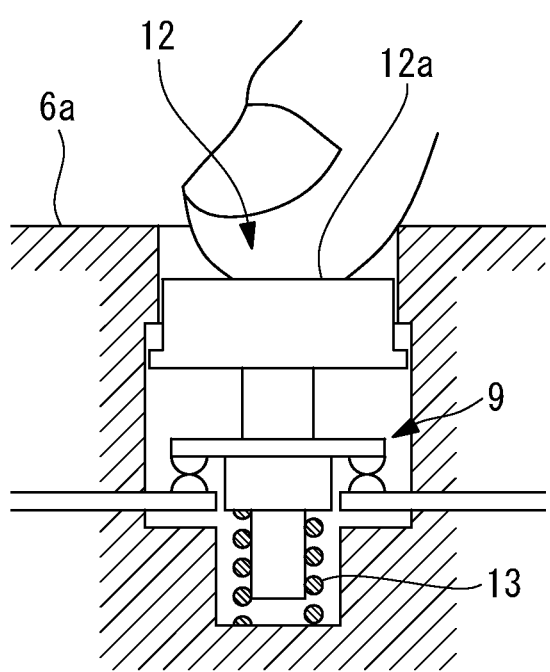
FIG. 5 is a vertical sectional view illustrating a pressed state of the switch included in the brake circuit in FIG. 2.

The switch 12 is a momentary-type push button switch that closes the second brake circuit 9 in a pressed state as illustrated in FIG. 5, and that, in a free state in which the switch 12 is not pressed, returns in a direction in which the second brake circuit 9 becomes open by means of a spring 13 as illustrated in FIG. 4.

The DC power source 11 and the switch 12 are fixed to the large-diameter portion (outermost surface) 6b of the fixed member 6 to which the motor 3 has been fixed. The switch 12 is provided such that a pressing surface 12a is pressable inward in the radial direction of the fixed member 6 with respect to a case outer surface (outermost surface) 6a, and, as illustrated in FIG. 4, the pressing surface 12a of the switch 12, in the free state, is disposed at a position recessed radially inward from the case outer surface 6a of the fixed member 6. The case outer surface 6a is a portion of the outermost peripheral surface of the actuator 2. In addition, the large-diameter portion 6b of the fixed member 6 and the case outer surface 6a form the outermost surface of the fixed member 6, and are disposed radially outside the motor 3 and the mobile member 7 in a direction along a predetermined-axis-X direction.

Next, a robot 100 according to an embodiment of the present invention will be described below with reference to the drawings.

The robot 100 according to this embodiment includes a plurality of the rotary axis modules 1 described above.

Figure 6:
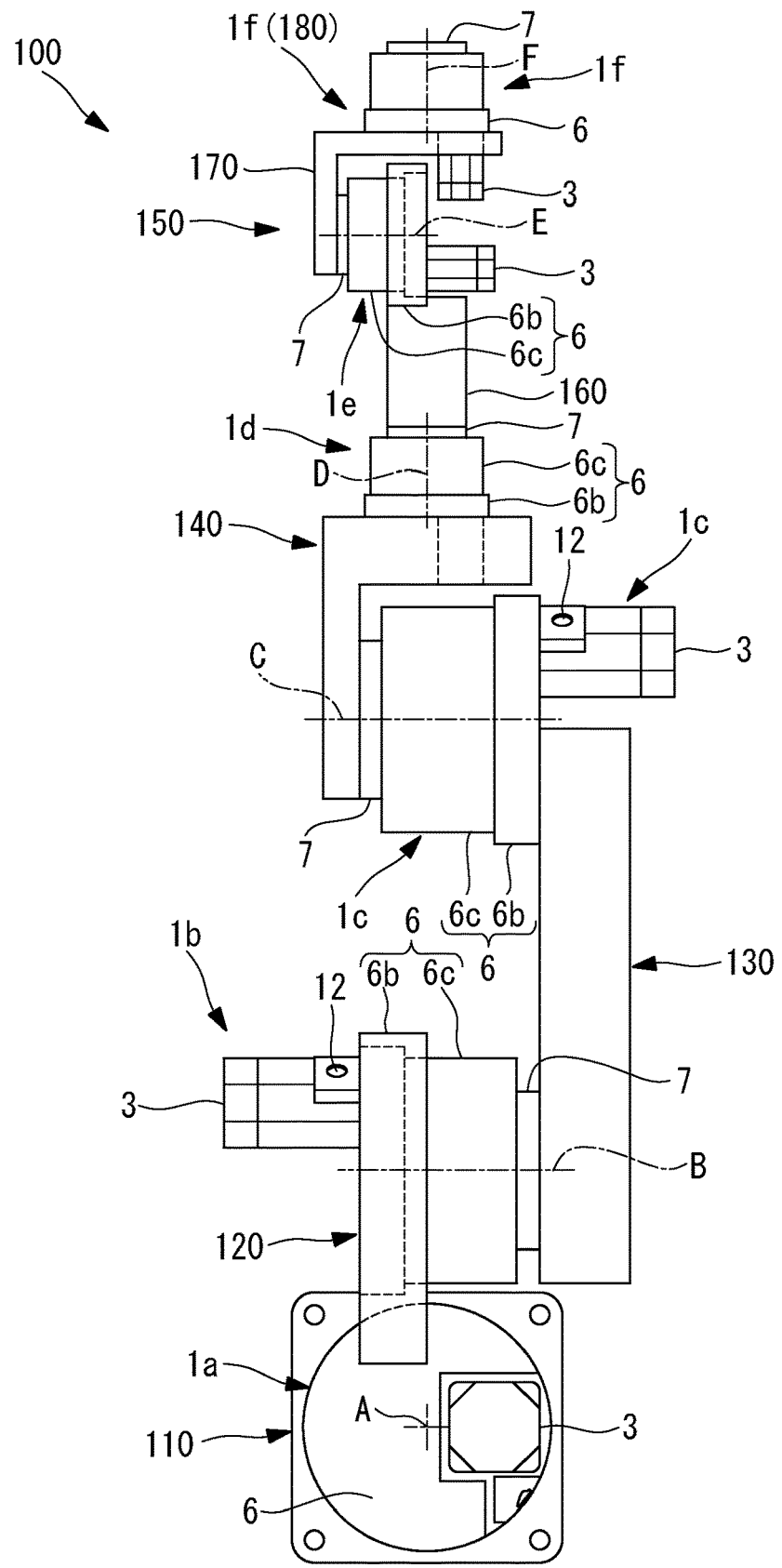
FIG. 6 is a plan view illustrating a robot according to an embodiment of the present invention in which the rotary axis module in FIG. 1 is provided on first to third axes.

As illustrated in FIG. 6, the robot 100 according to this embodiment is, for example, a six-axis articulated robot. The robot 100 includes a base 110 installed on an installation surface, and a revolving barrel 120 supported so as to rotate with respect to the base 110 about a vertical first axis (axis) A. In addition, the robot 100 includes a first arm 130 supported so as to rotate with respect to the revolving barrel 120 about a horizontal second axis (axis) B, and a second arm 140 supported so as to rotate with respect to the first arm 130 about a horizontal third axis (axis) C. Furthermore, the robot 100 is equipped with a three-axis wrist unit 150 at a distal end of the second arm 140.

The fixed member 6 of a first rotary axis module (rotary axis module) 1a is fixed to the revolving barrel 120, and the mobile member 7 is fixed to the base 110. The fixed member 6 of a second rotary axis module (rotary axis module) 1b is fixed to the revolving barrel 120, and the mobile member 7 is fixed to the first arm 130. The fixed member 6 of a third rotary axis module (rotary axis module) 1c is fixed to the first arm 130, and the mobile member 7 is fixed to the second arm 140. The rotary axis module 1 described above is used as the first to third rotary axis modules 1a, 1b, and 1c.

The wrist unit 150 includes a fourth rotary axis module 1d that drives a first wrist casing 160 so as to rotate about a fourth axis (axis) D with respect to the second arm 140, and a fifth rotary axis module 1e that drives a second wrist casing 170 so as to rotate about a fifth axis (axis) E with respect to the first wrist casing 160. In addition, in the wrist unit 150, the fixed member 6 is fixed to the second wrist casing 170, and the mobile member 7, which is rotatable about a sixth axis (axis) F, includes a sixth rotary axis module 1f forming a wrist flange 180.

A rotary axis module 1 that is smaller than the first to third rotary axis modules 1a, 1b, and 1c is used as the fourth to sixth rotary axis modules 1d, 1e, and 1f. In this embodiment, the fourth to sixth rotary axis modules 1d, 1e, and 1f are examples of rotary axis modules in which the motor 3 does not have the brake 5, and in which the first brake circuit 8 and the second brake circuit 9 are not provided. The present invention is not limited to this, and the fourth to sixth rotary axis modules 1d, 1e, and 1f may have the same configuration as the first to third rotary axis modules 1a, 1b, and 1c.

Although not illustrated, a driving cable, a brake control cable, and a cable from the encoder of each of the motors 3 are connected to the control device 10. The brake cable is connected to the first brake circuit 8. It is preferable that each of the cables penetrate the speed reducer 4 near the axis X of the speed reducer 4 in a direction along the axis X, in which the speed reducer 4 of each of the rotary axis modules 1a, 1b, 1c, 1d, 1e, and 1f has a hollow structure.

The operation of the rotary axis module 1 and the robot 100 according to this embodiment configured as above will be described.

According to the rotary axis module 1 of this embodiment, when the robot 100 is operated, the braking state of the brake 5 of the motor 3 of each axis is released by the supply of the DC voltage from the control device 10 to the first brake circuit 8. As a result, the motor 3 of each of the rotary axis modules 1a, 1b, 1c, 1d, 1e, and 1f is controlled on the basis of drive command signals from the control device 10, and a distal end of the wrist flange 180 can be disposed at a desired position and orientation.

In this case, the switch 12 provided in the second brake circuit 9 of each of the rotary axis modules 1a, 1b, 1c, 1d, 1e, and 1f is in the free state in which the pressing surface 12a is not being pressed, the second brake circuit 9 is open, and the DC voltage from the DC power source 11 is not applied to the brake 5.

Then, during the operation of the robot 100, when the power is cut due to an unexpected power failure, because the actuator 2 is no longer in the energized state, the supply of the DC voltage from the control device 10 is stopped, and the brake 5 provided in the actuator 2 of each of the rotary axis modules 1a, 1b, 1c, 1d, 1e, and 1f is operated. As a result, the orientation of the robot 100 is maintained in a state in which the power is cut.

In this case, the robot 100 may stop in an inconvenient orientation depending on the timing at which the power is cut. For example, in the case where the robot 100 is a collaborative robot that can operate in the presence of an operator or an object within a movable range, when the power is cut and an object is caught between the first arm 130 and the second arm 140 of the robot 100, there are cases where it is desirable to quickly resolve this situation.

In such a case, according to the rotary axis module 1 and the robot 100 according to this embodiment, by pressing the switch 12 provided on each of the rotary axis modules 1a, 1b, 1c, 1d, 1e, and 1f, it is possible to close the second brake circuit 9 and apply the DC voltage from the DC power source 11 to the brake 5. The braking state of the brake 5 to which the DC voltage has been applied is quickly released.

That is, there is an advantage that the braking states of the brakes 5 of the motors 3 of the robot 100 that has stopped in an inconvenient orientation can be released individually and quickly by pressing the switch 12 provided on each of the rotary axis modules 1a, 1b, 1c, 1d, 1e, and 1f, and an inconvenient orientation can be quickly eliminated.

In particular, since the switch 12 is provided in the first to third rotary axis modules 1a, 1b, and 1c, the operator can easily recognize the switch 12 corresponding to the axis for which the braking state is desired to be released on site, and can reliably individually release only the axis desired to be released. After the braking state has been released and the inconvenient orientation has been eliminated, by quickly returning to the braking state by releasing a hand from the switch 12 and setting the switch 12 to the free state, the orientation of the robot 100 can be maintained.

In addition, according to this embodiment, since the pressing surface 12a of the switch 12 is disposed at a position recessed from the case outer surface 6a of the fixed member 6, it is necessary to push down the switch 12 intentionally. That is, even when there is no intention to press the switch 12 and an object accidentally comes into contact with the vicinity of the switch 12, it is possible to prevent the pressing surface 12a from being pressed due to the presence of the fixed member 6 surrounding the switch 12.

In addition, since the pressing surface 12a of the switch 12 is disposed at a position recessed inward in the radial direction from the case outer surface 6a of the fixed member 6 so as to be pressable inward in the radial direction, the switch 12 can be easily accessed and pressed from outside of the speed reducer 4 in the radial direction. As a result, the operation of the switch 12 can be facilitated, and the switch 12 can be easily visually recognized from the outside.

In addition, by passing an actuator drive linear object or a tool drive linear object disposed on a distal end side of the wrist unit 150 with respect to the rotary axis module 1 through the hollow hole 4a, the linear object can be housed in the first arm 130 and the second arm 140 without being exposed at the outer surface of the arm of the robot 100.

Further, in this embodiment, the switch 12 may be provided with an accidental operation prevention mechanism (not illustrated) that prohibits operation of the switch 12. Accordingly, it is possible to more reliably prevent the switch 12 from being accidentally pressed and the braking state of the brake 5 from being released.

An openable/closable lid that covers the pressing surface 12a of the switch 12 or a breakable cover may be adopted as the accidental operation prevention mechanism. The lid or cover is preferably disposed flush with the case outer surface 6a of the fixed member 6 or slightly recessed from the case outer surface 6a.

In addition, in this embodiment, the DC power source 11 may be formed of a rechargeable battery, and there may be provided a charging circuit (not illustrated) for charging the battery, which serves as the DC power source 11, when the power source of the control device 10 is not cut. As a result, because the battery, which is the DC power source 11, is charged while the rotary axis module 1 is operating, the frequency at which the battery, which is the DC power source 11, has to be exchanged can be reduced, and the risk of unexpected battery exhaustion can be reduced.

Figure 7:
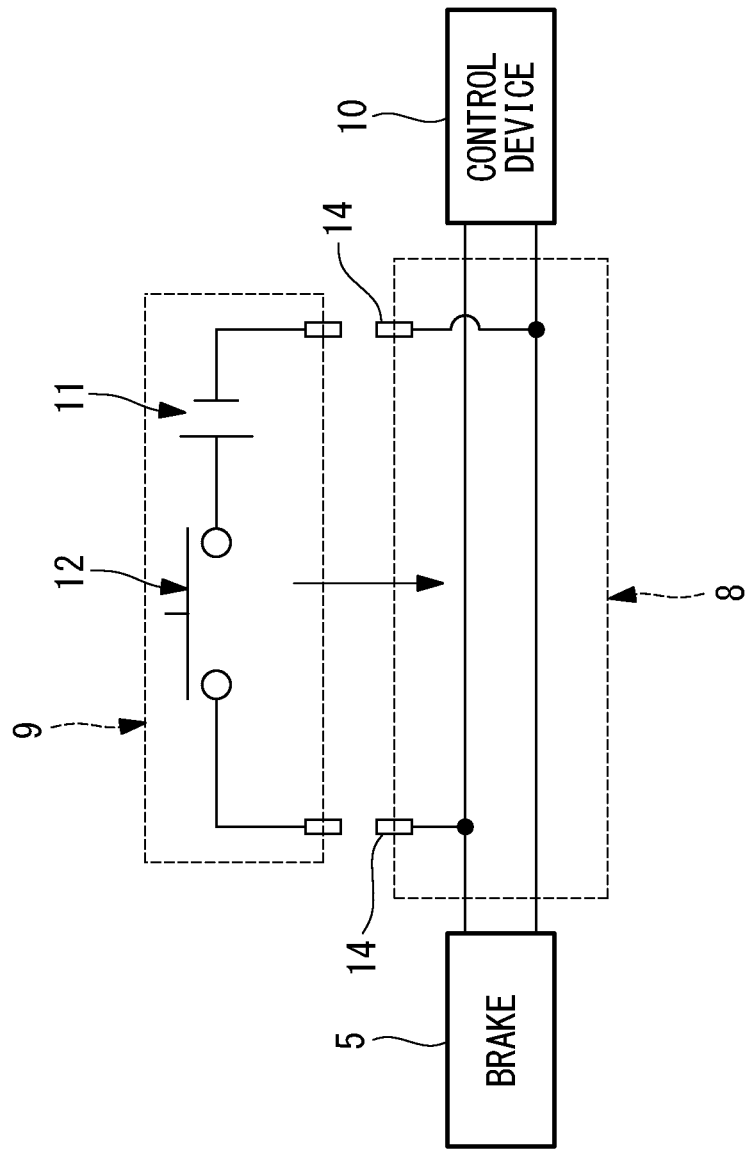
FIG. 7 is a schematic diagram illustrating a modification of the brake circuits in FIG. 3.

In addition, in the rotary axis module 1 according to this embodiment, as illustrated in FIG. 7, the first brake circuit 8 may be provided with a terminal 14 for detachably connecting the second brake circuit 9. The second brake circuit 9 including the DC power source 11 and the switch 12 may form a brake release unit that can be attached to and detached from the fixed member 6.

That is, with respect to a rotary axis module 1 for which manual release of the braking state of the brake 5 is less likely, the brake release unit can be left in a detached state. As a result, in the rotary axis module 1 such as that described above, if necessary, the brake release unit can be fixed to the fixed member 6, and the second brake circuit 9 can be connected between the terminals 14 of the first brake circuit 8.

In addition, in this embodiment, the six-axis articulated robot 100 has been illustrated; however, the present invention is not limited to this, and can be applied to any type of robot having at least one rotary axis module 1 described above.

In addition, in this embodiment, the robot 100 in which the respective rotary axis modules 1a, 1b, 1c, 1d, 1e, and 1f are assembled in a state in which the outermost surface thereof is exposed is illustrated. Instead of this, in the case where a casing (not illustrated) that covers the radial outer side of the rotary axis module 1 is provided, the pressing surface 12a of the switch 12 does not have to be recessed with respect to the case outer surface 6a of the fixed member 6, but may be disposed at a position recessed from the outermost surface of the casing.

In addition, although a push button switch is given as an example of the switch 12, a switch utilizing any other method may be adopted instead of the push button switch. In addition, as illustrated in FIGS. 1 and 2, the switch 12 is disposed at a position close to the motor 3 fixed to the large-diameter portion 6b of the fixed member 6, but the position of the switch 12 may be arbitrary.

In addition, although the actuator 2 including the motor 3 and the speed reducer 4 has been given as an example of the actuator 2, a direct drive motor having a hollow hole may be adopted instead.

In addition, in this embodiment, at least one of a twist amount measuring device, a torque measuring device, and a force sensor may be provided on the mobile member 7, which is the second member. The twist amount measuring device, the torque measuring device, or the force sensor may be attached to an end surface of the mobile member 7 serving as an output axis of the rotary axis module 1, or may be built in the mobile member 7.

As a result, a read-through operation for guiding the robot 100 by directly operating the first arm 130 or the second arm 140 by feedback of sensor information detected by the twist amount measuring device, the torque measuring device, and the force sensor, or contact determination using sensor information can be executed.

Figure 8:
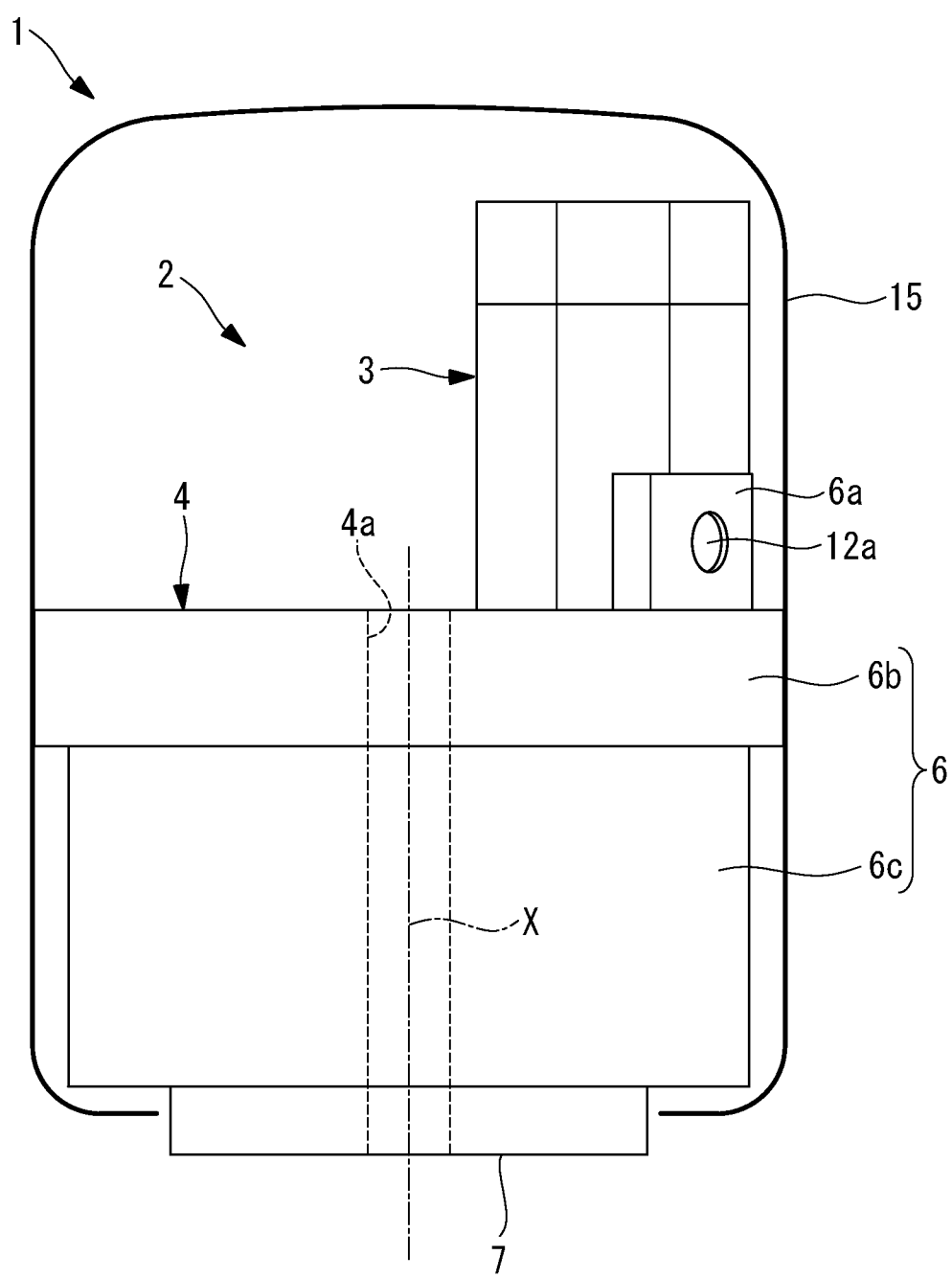
FIG. 8 is a side view illustrating a modification of the rotary module in FIG. 1.

In addition, in this embodiment, as illustrated in FIG. 8, the case outer surface 6a may have a maximum inner surface diameter, and a cover 15 that is cylindrical and that has rounded corner portions may be provided. As a result, since the outermost peripheral surface of the actuator 2 is the outer peripheral surface of the fixed member 6 including the case outer surface 6a, by covering the actuator 2 with the cover 15, it is possible to relatively easily provide an arm surface that is smooth and has no edges like the arm surface required for a collaborative robot.

The invention claimed is:

1. A rotary axis module comprising:
an actuator that comprises a first member and a second member, the actuator relatively driving the second member so as to rotate about a predetermined axis with respect to the first member;
a DC power source; and
a switch,
wherein the actuator comprises a brake that is releasable by supplying a DC voltage, and
a first brake circuit that is connected to a control device that controls the actuator and a second brake circuit that is provided in parallel with the first brake circuit and connected to the DC power source via the switch, are connected to the brake.

2. The rotary axis module according to claim 1, wherein the switch is a push button switch that is closed in a pressed state and open in a free state in which the switch is not being pressed.

3. The rotary axis module according to claim 2, wherein the brake, the DC power source and the switch are disposed in the first member, and
in the free state, a pressing surface of the switch is disposed at a position recessed from an outermost surface of the first member.

4. The rotary axis module according to claim 3, wherein the pressing surface is disposed so as to be pressable inward in a radial direction at a position recessed inward in the radial direction from the outermost surface of the first member.

5. The rotary axis module according to claim 1, wherein the switch is provided with an erroneous operation prevention mechanism that prohibits operation of the switch.

6. The rotary axis module according to claim 1, wherein the first brake circuit is provided with terminals for detachably connecting the second brake circuit, and
the second brake circuit comprising the DC power source and the switch constitutes a brake release unit that is attachable to and detachable from the actuator.

7. The rotary axis module according to claim 1, further comprising:
a charging circuit that charges the DC power source while the actuator is energized,
wherein the DC power source comprises a rechargeable battery.

8. The rotary axis module according to claim 1, wherein a hollow hole through which a linear object is passed is provided in a vicinity of the predetermined axis.

9. The rotary axis module according to claim 1, wherein the second member is provided with at least one of a twist amount measuring device, a torque measuring device, and a force sensor.

10. The rotary axis module according to claim 4, wherein the actuator comprises a motor, and
the outermost surface of the first member is disposed radially outward of the motor and the second member in a direction along the predetermined axis.

11. A rotary axis module comprising:
an actuator that comprises a first member and a second member, the actuator relatively driving the second member so as to rotate about a predetermined axis with respect to the first member;
wherein the actuator comprises a brake that is releasable by supplying a DC voltage, a first brake circuit that connects to a control device that controls the actuator is connected to the brake, and the first brake circuit is provided with terminals to which a second brake circuit that connects to a DC power source via a switch is connectable in parallel.

12. A robot comprising: at least one rotary axis module having an actuator that comprises a first member and a second member, the actuator relatively driving the second member so as to rotate about a predetermined axis with respect to the first member;

a DC power source; and a switch, wherein the actuator comprises a brake that is releasable by supplying a DC voltage, and a first brake circuit that is connected to a control device that controls the actuator and a second brake circuit that is provided in parallel with the first brake circuit and connected to the DC power source via the switch, are connected to the brake.

\* \* \* \* \*